US008239810B2

(12) United States Patent
Abbaspour et al.

(10) Patent No.: US 8,239,810 B2
(45) Date of Patent: Aug. 7, 2012

(54) METHOD AND SYSTEM FOR OPTIMIZING A DEVICE WITH CURRENT SOURCE MODELS

(75) Inventors: Soroush Abbaspour, Ossining, NY (US); Peter Feldmann, New York, NY (US); Peter A. Habitz, Hinesburg, VT (US); Safar Hatami, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 12/944,480

(22) Filed: Nov. 11, 2010

(65) Prior Publication Data

US 2012/0124542 A1 May 17, 2012

(51) Int. Cl.
*G06F 9/455* (2006.01)
*G06F 17/50* (2006.01)
(52) U.S. Cl. ........ 716/133; 716/106; 716/108; 716/113; 716/132; 716/134

(58) Field of Classification Search .................. 716/106, 716/108, 113, 127, 133, 134, 132
See application file for complete search history.

(56) References Cited

U.S. PATENT DOCUMENTS

| 4,939,389 A | 7/1990 | Cox et al. |
| 5,307,381 A | 4/1994 | Ahuja |
| 5,309,035 A | 5/1994 | Watson, Jr. et al. |
| 2003/0042959 A1* | 3/2003 | Song .............................. 327/258 |
| 2010/0090738 A1 | 4/2010 | Changchein et al. |

* cited by examiner

*Primary Examiner* — Vuthe Siek
*Assistant Examiner* — Brian Ngo
(74) *Attorney, Agent, or Firm* — Cantor Colburn LLP; Richard Kotulak (57) ABSTRACT

A method for optimizing a circuit includes at least a first branch and a second branch includes defining an objective function using a shape of waveforms measured at a timing point in each branch, and optimizing the objective function to minimize a variance of clock skew of the first branch and the second branch across different process voltage temperature values.

16 Claims, 6 Drawing Sheets

METHOD AND SYSTEM FOR OPTIMIZING A DEVICE WITH CURRENT SOURCE MODELS

BACKGROUND

The present invention relates to device optimization, and more specifically, to minimizing variance of arrival times of waveforms in circuits in the presence of process environmental variations.

Circuit optimization includes, for example, minimizing variance of arrival times of waveforms in circuits in the presence of process voltage temperature variations. Process voltage temperature (PVT) conditions affect the performance of devices in a circuit. For example, changing the temperature of a device in a circuit changes the electrical properties of the device. The time delay of signal paths may be further affected by changes in the PVT conditions.

Many circuits use a system or reference clock to operate effectively. The reference clock outputs a clock signal that may be propagated through a variety of signal paths or branches in a circuit. The signal paths may include conductive interconnects or lines that connect a variety of devices such as field effect transistors that define the signal paths. The electrical properties of the signal paths may be different. For example, the physical length of interconnects between devices in a path, or the properties of a devices in the path may induce a time delay in the clock signal.

BRIEF SUMMARY

According to one embodiment of the present invention, a method for optimizing a circuit includes at least a first branch and a second branch includes defining an objective function using a shape of waveforms measured at a timing point in each branch, and optimizing the objective function to minimize a variance of clock skew of the first branch and the second branch across different process voltage temperature values.

According to another embodiment of the present invention, a system for optimizing a circuit includes a memory, and a processor operative to define an objective function using a shape of waveforms measured at a timing point in each branch, and optimize the objective function to minimize a variance of clock skew of the first branch and the second branch across different process voltage temperature values.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Clock skew or timing skew is a circuit phenomenon in which the clock signal sent from the clock reference arrives at different components of the circuit at different times. The clock skew can occur for different reasons, such as, for example different electrical properties of the clock signal paths, interconnect lengths, variations in intermediate components of clock branches, PVT conditions, and cross talk. Minimizing the variance of clock skew across different clock paths is a major step in the process of circuit optimization. Furthermore, for the deep submicron technology in which the clock frequency is high, robustness of clock skew is desirable for properly functioning circuits.

Figure 1:
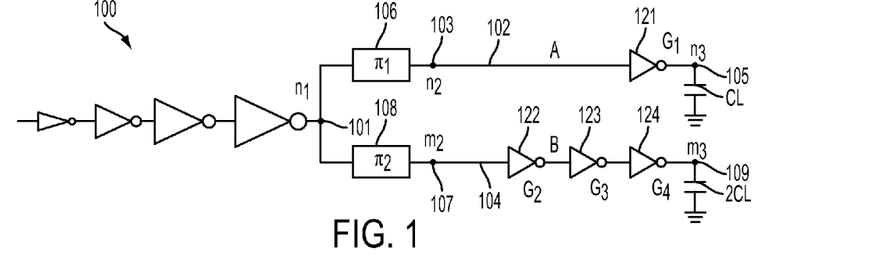
FIG. 1 illustrates a block diagram of an example of a simulated circuit.

FIG. 1 illustrates a block diagram of an example of a simulated circuit 100. The circuit 100 includes a node (timing point) n1 101 that is connected to a signal path A 102 and a signal path B 104. The signal path A 102 includes nodes n2 103 and n3 105, and the signal path B 104 includes nodes m2 107 and m3 109. The signal paths include function gates (G1 121; G2 122; G3 123; and G4 124) that may be formed from, for example, field effect transistors that mathematically represent features of a circuit and interconnect boxes 106 and 108. In the illustrated example, the interconnect box 106 ($\pi 1$) of is more capacitive than the interconnect box 108 ($\pi 2$). The gates (G1 120-G4 124) are arranged to balance the delay of the signal paths 102 and 104) measured at the nodes n3 105 and m3 109.

Figure 2:
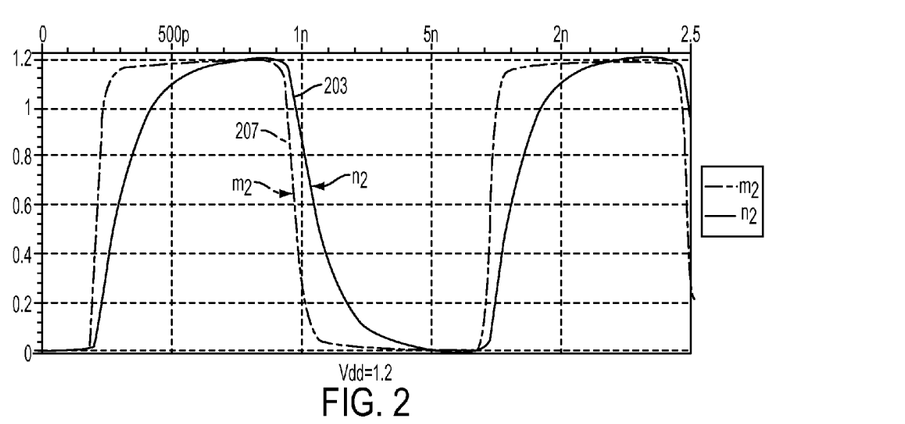
FIGS. 2-5 illustrate graphs that show waveforms of signals measured through simulation of the circuit of FIG. 1.
Figure 3:
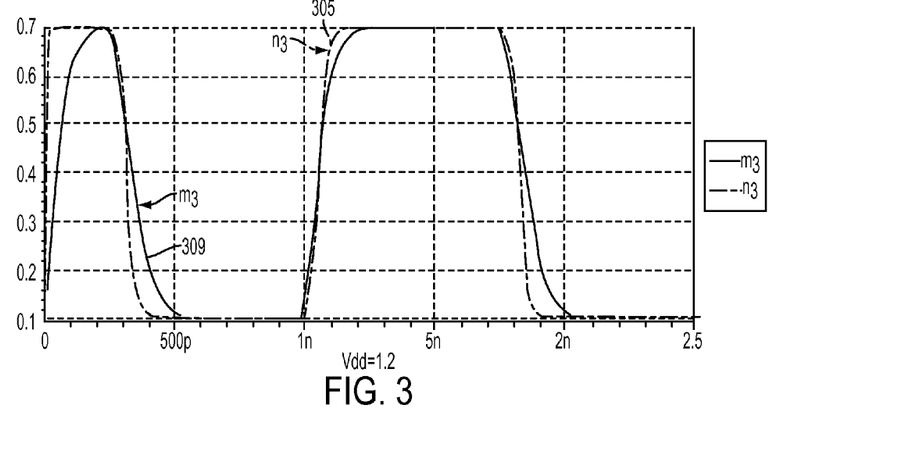

FIGS. 2 and 3 illustrate graphs that show waveforms of signals measured through simulation at the nodes 103, 107, 105 and 109 at a constant PVT condition of Vdd=1.2. Referring to FIG. 2, the waveform 203 represents the measured signal at node n2 103 (of FIG. 1), while the waveform 207 represents the measured signal at node m2 107. Since the interconnect box 106 ($\pi 1$) of is more capacitive than the interconnect box 108 ($\pi 2$), the slew of the waveform 203 at the node n2 103 is greater (approximately 3.3 times greater) than the slew of the waveform 207 at the node m2 107. Referring to FIG. 3, the waveform 305 represents the measured signal at node n3 105 (of FIG. 1), while the waveform 309 represents the measured signal at node m3 109. As discussed above, the gates (G1-G4) are arranged to reduce the difference in the skew between the waveforms 305 and 309 (i.e., optimizing the circuit 100 to balance the delay of the signal paths 102 and 104.

Figure 4:
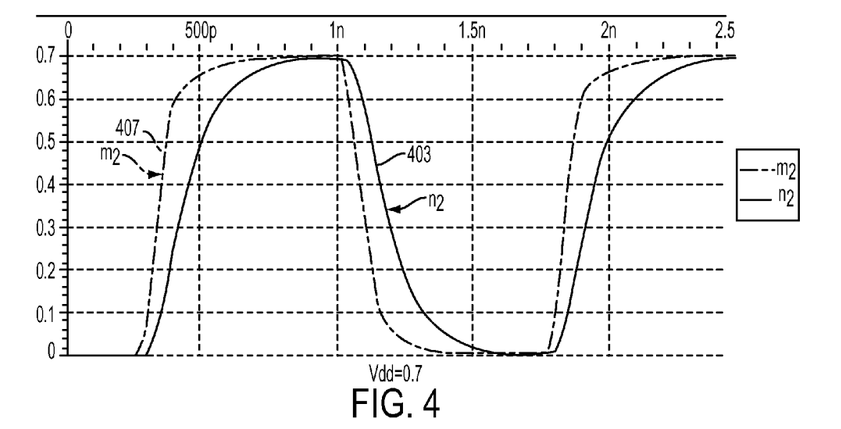
Figure 5:
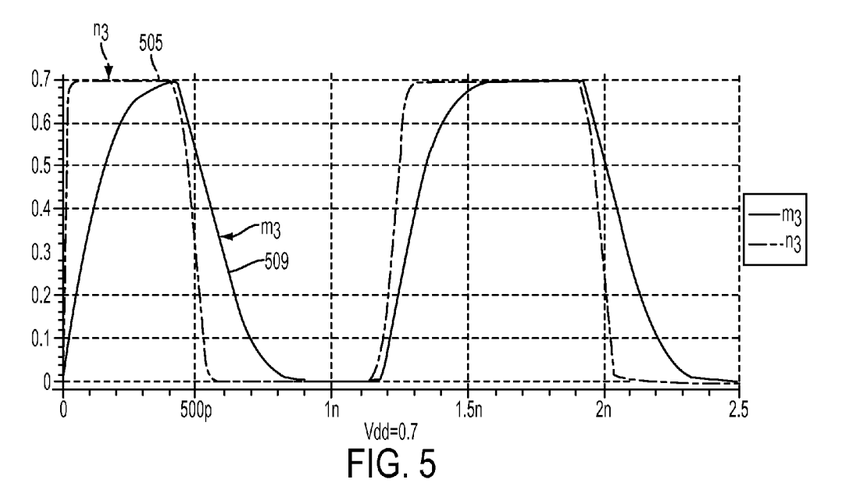

FIGS. 4 and 5 illustrate graphs that show waveforms of signals measured through simulation at the nodes 103, 107, 105 and 109 at a constant PVT condition of Vdd=0.7. The change in the PVT condition has changed the measured waveforms. Referring to FIG. 4, the wave form 403 represents the measured signal at the node n2 103, and the waveform 407 represents the measured signal at the node m2 107. Referring to FIG. 5, the waveform 505 represents the measured signal at node n3 105, while the wave form 509 represents the measured signal at node m3 109. As illustrated, it is apparent that changing the PVT condition of the circuit 100 affects the optimization of the circuit 100. Thus, a method that robustizes the optimization of the circuit over a range of different PVT conditions is desired.

Figure 6:
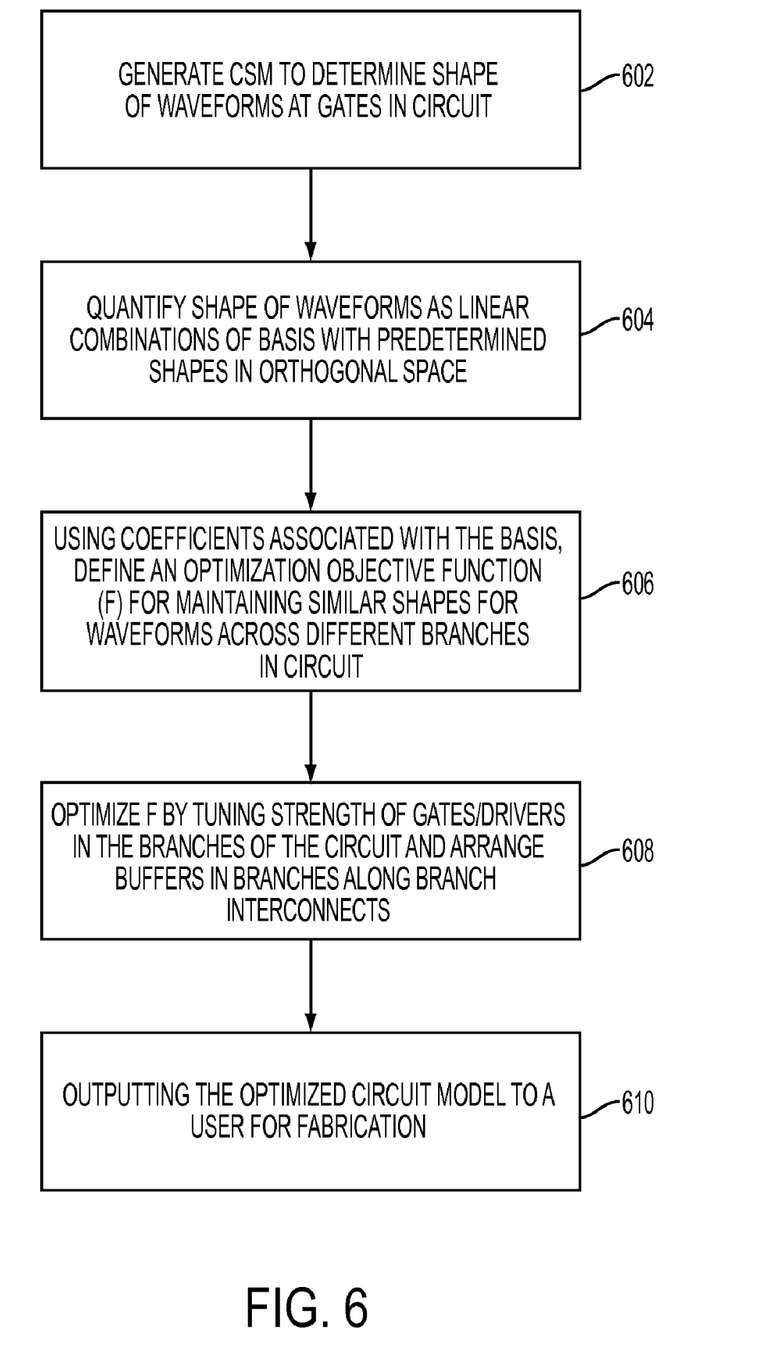
FIG. 6 illustrates a block diagram of an exemplary method for optimizing a circuit.

FIG. 6 illustrates a block diagram of an exemplary method for optimizing a circuit. In the exemplary method, it is desirable to match the shapes of the waveforms at each gate (or device) in the circuit to minimize the effective differences in clock delay between the signal paths (branches) in the circuit. In this regard, in block 602, a current source model (CSM) is generated to determine the shape of the waveforms at each of the gates in a circuit. A current source model is a model of logic cells/gates/devices to generate/model the output waveform of the device for an arbitrary input waveform and output load of the device (logic cell). Logic cells and devices are typically modeled as follows. Circuit-level simulations are performed on the CMOS logic cells loaded by a range of capacitance values and excited by voltage ramps with a range of input slew values. ECSM-based modeling/characterization uses tables of cell voltage response tables while CCS-based libraries store the characterized data as tables of current as a function of time. In block 604, the waveforms of each of the gates in the circuit may be quantified (described) as linear combinations of independent basic waveforms (basis, P) with predetermined shapes in an orthogonal space. An example of a linear combination representation of a waveform W is as: $W = \alpha_0 + \alpha_1 P_1 + \alpha_2 P_2 + \alpha_3 P_3 + \alpha_4 P_4 + \ldots$; where $\alpha_0$ is the delay in the branch; and the terms $\alpha_1$ and $\alpha_2$ define a slope and skewness respectively of a waveform in the branch. In block 606, coefficients ($\alpha$) associated with the basis are used to define an optimization objective function (F) (minimization/optimization function of the variance of clock skew across different branches) while maintaining similar shapes for the waveforms across the different branches in the circuit in the process of skew minimization. In block 608, the function F is optimized to reduce the skew of the clock signal in the branches having different loads (gates or devices in the signal path). The optimization of the function F includes optimizing/minimizing the variance of the skew/delay across different branches while making the coefficients of the waveforms similar for each of the branches at the inputs of the gates. The optimization includes tuning the strengths of the gates or drivers on the branches and arranging buffers (gates) along the interconnects of the branches by inserting or removing or relocating buffers. Buffer insertion, gate sizing and technology mapping are some of the optimization methods. In general, a buffer insertion method by adding/removing/relocating (arranging) a buffer to tune the delay of a signal path.

Figure 7:
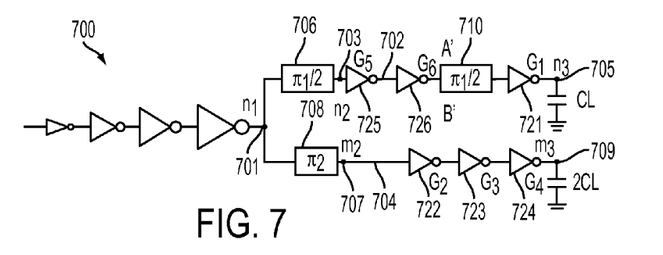
FIG. 7 illustrates an example of an optimized circuit.

FIG. 7 illustrates an example of an optimized circuit 700. The circuit 700 is a resultant circuit following the optimization of the circuit 100 (of FIG. 1) using a method similar to the method described in FIG. 6 above. The circuit 700 is similar to the circuit 100 however; the circuit 700 includes an optimized arrangement of gates and interconnects. In this regard, the circuit 700 includes a node n1 701 that is connected to a signal path A' 702 and a signal path B' 704. The signal path A' 702 includes nodes n2 703 and n3 705, and the signal path B' 704 includes nodes m2 707 and m3 709. The signal paths include gates (G1 721; G2 722; G3 723; G4 724; G5 725; and G6 726) and interconnect boxes 706, 708, and 710. The gates (G1 720-G6 726) are arranged to reduce the differences between waveforms (caused, at least in part, by the differences in capacitance in the signal paths 702 and 704) measured at the nodes n3 705 and m3 709. As an example of buffer insertion, the gate G5 and G6 have inserted into the interconnect 106 of the circuit 100 at FIG. 1 to balance the delay of branch A and B of the circuit 100.

Figure 8:
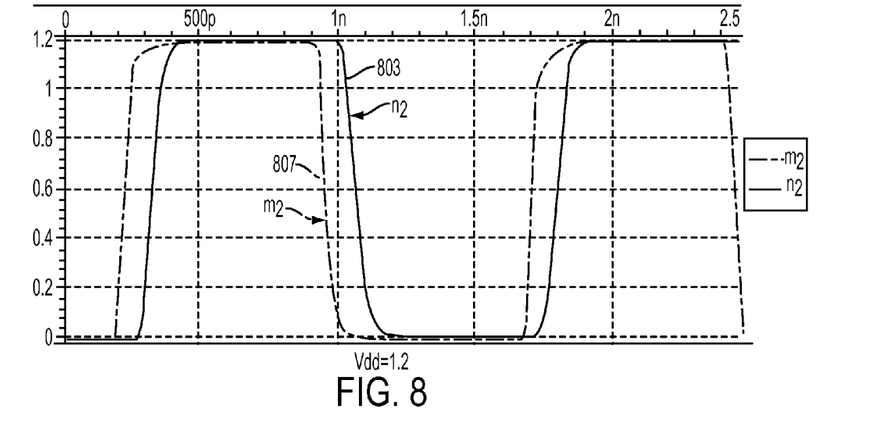
FIGS. 8-11 illustrate graphs that show waveforms of signals measured through simulation of the circuit of FIG. 7.
Figure 9:
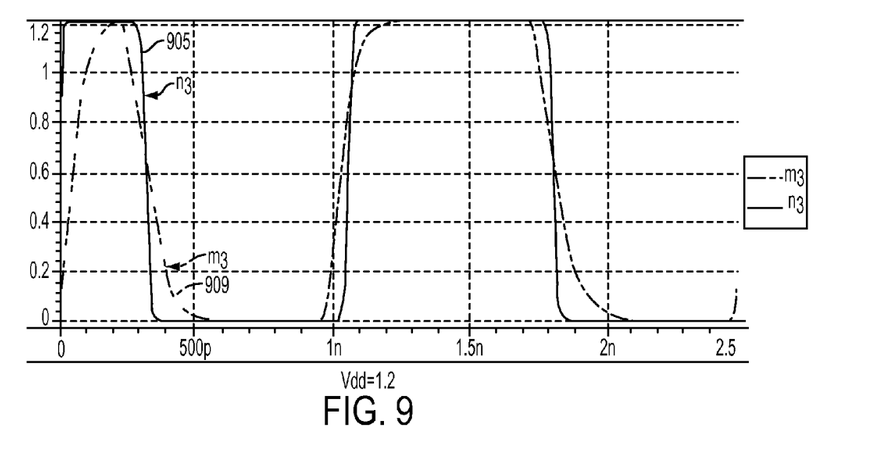

FIGS. 8 and 9 represent graphs of similar measurements described above (in FIGS. 2 and 3) at a constant PVT condition of Vdd=1.2. Referring to FIG. 8, the waveform 803 represents the measured signal at node n2 703 (of FIG. 7), while the waveform 807 represents the measured signal at node m2 707. Comparing the waveforms 803 and 807 shows that the waveforms 803 and 807 have similar shapes. Referring to FIG. 9, the waveform 905 represents the measured signal at node n3 705 (of FIG. 7), while the waveform 907 represents the measured signal at node m3 709. As discussed above, the gates (G1 721-G6 726) are arranged to reduce the difference in the skew between the waveforms 905 and 909 (i.e., optimizing the circuit 700 to reduce the effects of the different capacitance of the signal paths 702 and 704.

Figure 10:
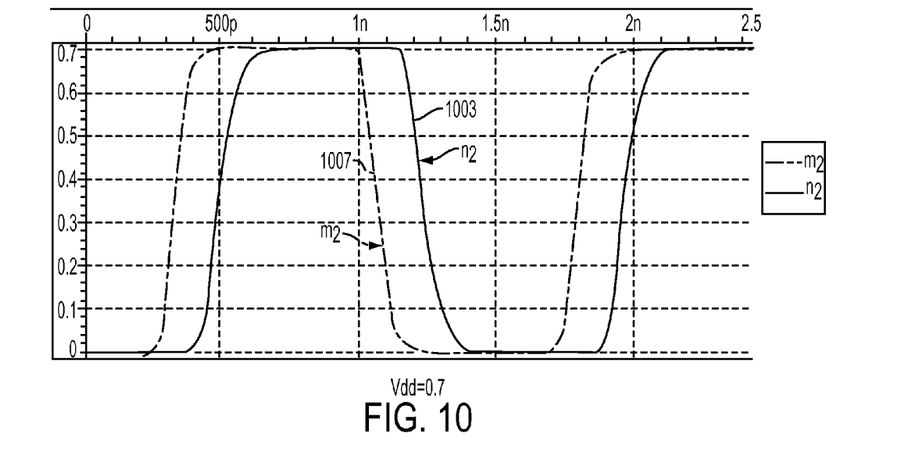
Figure 11:
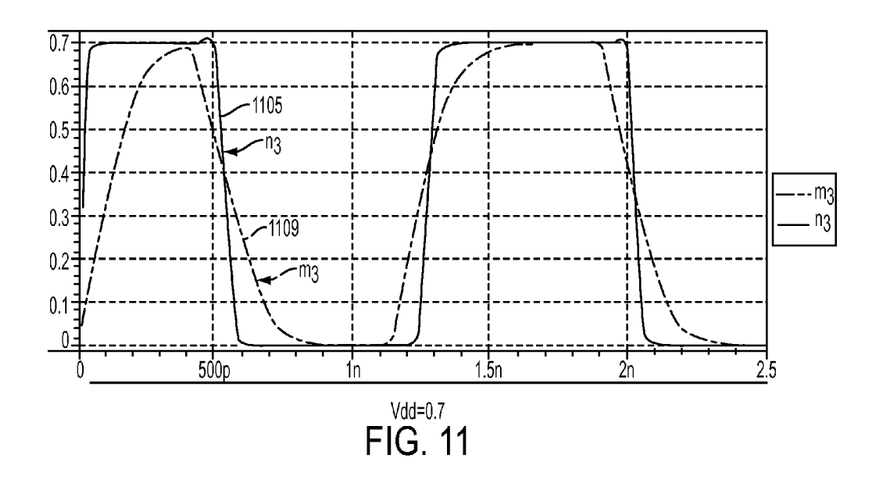

As discussed in the examples of FIGS. 1-5 above, the change in the PVT condition resulted in an undesirable change in the shapes of the respective wave forms. FIGS. 10 and 11 illustrate graphs that show waveforms of signals measured through simulation at the nodes 703, 707, 705 and 709 (of FIG. 7) at a constant PVT condition of Vdd=0.7. Referring to FIG. 10, the waveform 1003 represents the measured signal at the node n2 703, and the waveform 1007 represents the measured signal at the node m2 707. Referring to FIG. 11, the waveform 1105 represents the measured signal at node n3 705, while the wave form 1109 represents the measured signal at node m3 709. The change in the PVT condition has changed the measured waveforms however; the change in the skew of the waveforms (i.e., the difference between the delay of the different branches) is less than in the examples of FIGS. 1-5 discussed above. Thus, the methods described above in FIG. 6 are operative to reduce changes in the skew of waveforms at comparable nodes in branches of a circuit across a range of PVT conditions. By maintaining the shapes of the waveforms, the effective delays for the signals in the branches are less severe, resulting in an optimized circuit having more balanced branches (minimized the variance of clock skew).

Figure 12:
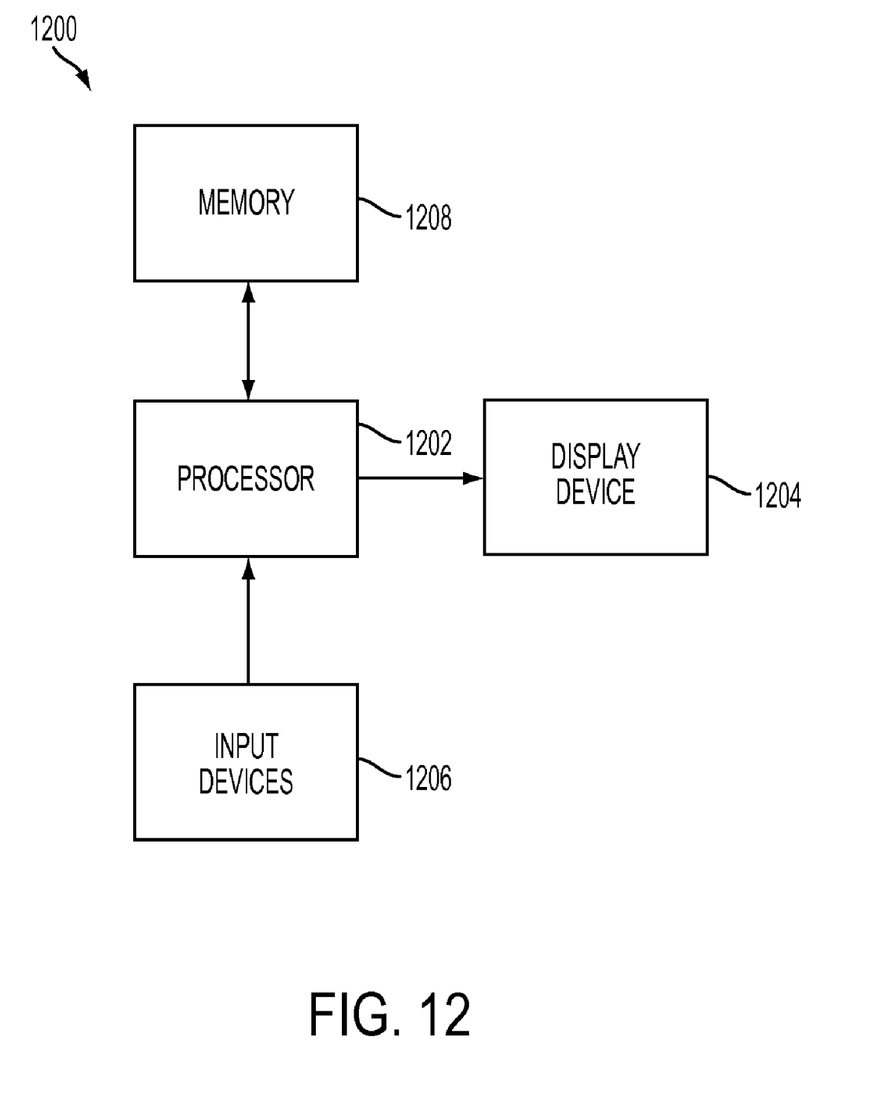
FIG. 12 illustrates a block diagram of an exemplary system.

FIG. 12 illustrates a block diagram of an exemplary embodiment of a system 1200. The system 1200 includes a processor 1202 communicatively linked to a display device 1204, input devices 1206, and a memory 1208. The system 1200 may be used to implement any of the methods described above. For example, the circuit 100 may be simulated in the system 1200 and optimized using similar methods as described in of FIG. 6 to optimize the simulated circuit 100. The optimized simulated circuit 100 may be output on the display 1204 to a user. A circuit similar to the optimized simulated circuit 100 may then be fabricated using any suitable fabrication process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for optimizing a circuit including at least a first branch and a second branch, the method comprising:

defining an objective function with a processor using a shape of waveforms measured at a timing point in each branch;

quantifying the shapes of the waveforms as linear combinations of basis waveforms in an orthogonal space;

defining the optimization objective function, wherein the optimization objective function is a function of the coefficients of basis waveforms and an optimization parameter using coefficients of the basis waveforms;

optimizing the objective function to minimize a variance of clock skew of the first branch and the second branch across different process voltage temperature values; and outputting the optimized objective function to a user on a display.

2. The method of claim 1, wherein the optimizing the objective function includes maintaining similar shapes of the waveforms of the first branch and second branch.

3. The method of claim 1, wherein a gate timing model is used to generate the output waveforms of a timing point in the first branch and the second branch.

4. The method of claim 3, wherein the gate timing model includes a current source model.

5. The method of claim 1, wherein the timing point is associated with a logic gate device.

6. The method of claim 1, wherein the first and the second branches include interconnects and logic cells.

7. The method of claim 1, wherein optimizing the function includes tuning the strength of the devices in the branches.

8. The method of claim 1, wherein the method further includes arranging buffer devices in the branches responsive to optimizing the function.

9. A system for optimizing a circuit, the system comprising:

a memory; and a processor operative to define an objective function using a shape of waveforms measured at a timing point in each branch, quantify the shapes of the waveforms as linear combinations of basis waveforms in an orthogonal space, define the optimization objective function, wherein the optimization objective function is a function of the coefficients of basis waveforms and an optimization parameter using coefficients of the basis waveforms, and optimize the objective function to minimize a variance of clock skew of the first branch and the second branch across different process voltage temperature values.

10. The system of claim 9, wherein the optimizing the objective function includes maintaining similar shapes of the waveforms of the first branch and second branch.

11. The system of claim 9, wherein a gate timing model is used to generate the output waveforms of a timing point in the first branch and the second branch.

12. The system of claim 11, wherein the gate timing model includes a current source model.

13. The system of claim 9, wherein the timing point is associated with a logic gate device.

14. The system of claim 9, wherein the first and the second branches include interconnects and logic cells.

15. The system of claim 9, wherein optimizing the function includes tuning the strength of the devices in the branches.

16. The system of claim 9, wherein the processor is further operative to arrange buffer devices in the branches responsive to optimizing the function.

* * * * *